(12) United States Patent
Okubo

(10) Patent No.: US 11,977,795 B2
(45) Date of Patent: May 7, 2024

(54) PRINTING APPARATUS, CONTROL METHOD, AND STORAGE MEDIUM FOR STORING PROGRAM AND EXECUTING AN IDENTIFIED ALTERNATIVE PROCESSING

(71) Applicant: CANON KABUSHIKI KAISHA, Tokyo (JP)

(72) Inventor: Takahiro Okubo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/135,762

(22) Filed: Apr. 18, 2023

(65) Prior Publication Data

US 2023/0342093 A1  Oct. 26, 2023

(30) Foreign Application Priority Data

Apr. 26, 2022  (JP) ................ 2022-072667

(51) Int. Cl.
*G06F 3/12* (2006.01)

(52) U.S. Cl.
CPC ............ *G06F 3/121* (2013.01); *G06F 3/1256* (2013.01); *G06F 3/1257* (2013.01); *G06F 3/1264* (2013.01); *G06F 3/1204* (2013.01)

(58) Field of Classification Search
CPC ...... G06F 3/121; G06F 3/1256; G06F 3/1257; G06F 3/1264; G06F 3/1204

USPC ........................................ 358/1.15
See application file for complete search history.

(56) References Cited

U.S. PATENT DOCUMENTS

| 9,740,971 | B1* | 8/2017 | Iwasawa | G06F 3/1203 |
| 2007/0291286 | A1* | 12/2007 | Utsunomiya | H04N 1/00015 |
| | | | | 358/1.8 |
| 2012/0229852 | A1 | 9/2012 | Kubo et al. | |
| 2013/0132935 | A1* | 5/2013 | Kuroki | G06F 8/654 |
| | | | | 717/168 |

FOREIGN PATENT DOCUMENTS

JP  2012-187745 A  10/2012

* cited by examiner

*Primary Examiner* — Allen H Nguyen
(74) *Attorney, Agent, or Firm* — VENABLE LLP

(57) ABSTRACT

A printing apparatus includes a first discharge unit to discharge a printing medium on which printing has been performed, and a second discharge unit to discharge a printing medium on which printing has been performed. A determination unit, in a case where the first discharge unit is instructed to be a discharge destination of a printing medium, determines whether to discharge the printing medium from the first discharge unit based on a predetermined condition. An identification unit, in a case where the determination unit determines not to discharge the printing medium from the first discharge unit, identifies alternative processing previously instructed by a user. An execution unit executes the alternative processing identified by the identification unit.

19 Claims, 10 Drawing Sheets

| CONDITION | VALUE | WHETHER OR NOT TO PERFORM TOP DISCHARGE |
|---|---|---|
| SHEET TYPE | PLAIN PAPER | YES |
| SHEET TYPE | CARDBOARD | NO |
| CUTTING MODE | CUTTING | YES |
| CUTTING MODE | NO CUTTING | NO |
| FEEDING FORM | ROLLED PAPER | YES |
| FEEDING FORM | CUT PAPER | NO |
| STACKING STATE OF TOP DISCHARGE DESTINATION | NOT FULLY STACKED | YES |
| STACKING STATE OF TOP DISCHARGE DESTINATION | FULLY STACKED | NO |

FIG. 8

```xml
<?xml version="1.0" encoding="utf-8"?>
<cmd xmlns:job="http://www.xml.com/ns/cmd/2020/">
  <job:contents>
   <job:operation>SetParam</job:operation>
   <job:param service="print">
     <job:jobname><![CDATA[Document1]]></job:jobname>
     <job:username><![CDATA[User1]]></job:username>
     <job:copies>1</job:copies>
   </job:param>
  </job:contents>
</cmd>
```

FIG. 9

| IDENTIFICATION NUMBER | USERNAME | METHOD FOR RESOLVING ERROR | STORAGE DATE AND TIME |
|---|---|---|---|
| 1 | User1 | CHANGE TO FRONT DISCHARGE AND PERFORM PRINTING | 2020/04/13 17:55:00 |
| 2 | User2 | CHANGE TO FRONT DISCHARGE AND PERFORM PRINTING | 2020/07/04 16:54:00 |
| 3 | User3 | CANCEL PAGE | 2020/07/11 11:39:00 |
| 4 | User4 | CHANGE TO FRONT DISCHARGE AND PERFORM PRINTING | 2020/07/22 15:25:00 |
| 5 | User5 | CANCEL JOB | 2020/07/28 09:00:00 |
| 6 | User6 | CANCEL PAGE | 2020/12/12 11:39:00 |
| 7 | — | — | — |
| 8 | — | — | — |
| 9 | — | — | — |
| 10 | — | — | — |

PRINTING APPARATUS, CONTROL METHOD, AND STORAGE MEDIUM FOR STORING PROGRAM AND EXECUTING AN IDENTIFIED ALTERNATIVE PROCESSING

BACKGROUND OF THE INVENTION

Field of the Invention

The present invention relates to a printing apparatus, a control method thereof, and a storage medium for storing a program.

Description of the Related Art

Japanese Patent Laid-Open No. 2012-187745, for example, proposes the following as a response to a case such as when an error occurs in a printing apparatus. Specifically, one page's worth of data is interpreted before printing each page included in a job to determine whether it can be predicted that an error will occur. Then, in a case where it is determined that it can be predicted that an error will occur, printing of subsequent pages is canceled, data of the job is stored in a storage region, and the job is ended.

SUMMARY OF THE INVENTION

The present invention provides a printing apparatus capable of executing processing according to a user's intent while reducing the user's operational input, a control method thereof, and a storage medium for storing a program.

The present invention in one aspect provides a printing apparatus comprising: a first discharge unit configured to discharge a printing medium on which printing has been performed; a second discharge unit configured to discharge a printing medium on which printing has been performed; a determination unit configured to, in a case where the first discharge unit is instructed to be a discharge destination of a printing medium, determine whether to discharge the printing medium from the first discharge unit based on a predetermined condition; an identification unit configured to, in a case where the determination unit determines not to discharge the printing medium from the first discharge unit, identify alternative processing previously instructed by a user; and an execution unit configured to execute the alternative processing identified by the identification unit.

According to the present invention, it is possible to provide a printing apparatus capable of executing processing according to a user's intent while reducing the user's operational input.

Further features of the present invention will become apparent from the following description of exemplary embodiments with reference to the attached drawings.

BRIEF DESCRIPTION OF THE DRAWINGS

FIG. 8 is a diagram illustrating an example of a method for specifying a user in a print job.

FIG. 9 is a diagram illustrating an example of information related to alternative processing stored in a storage unit.

DESCRIPTION OF THE EMBODIMENTS

Figure 1:
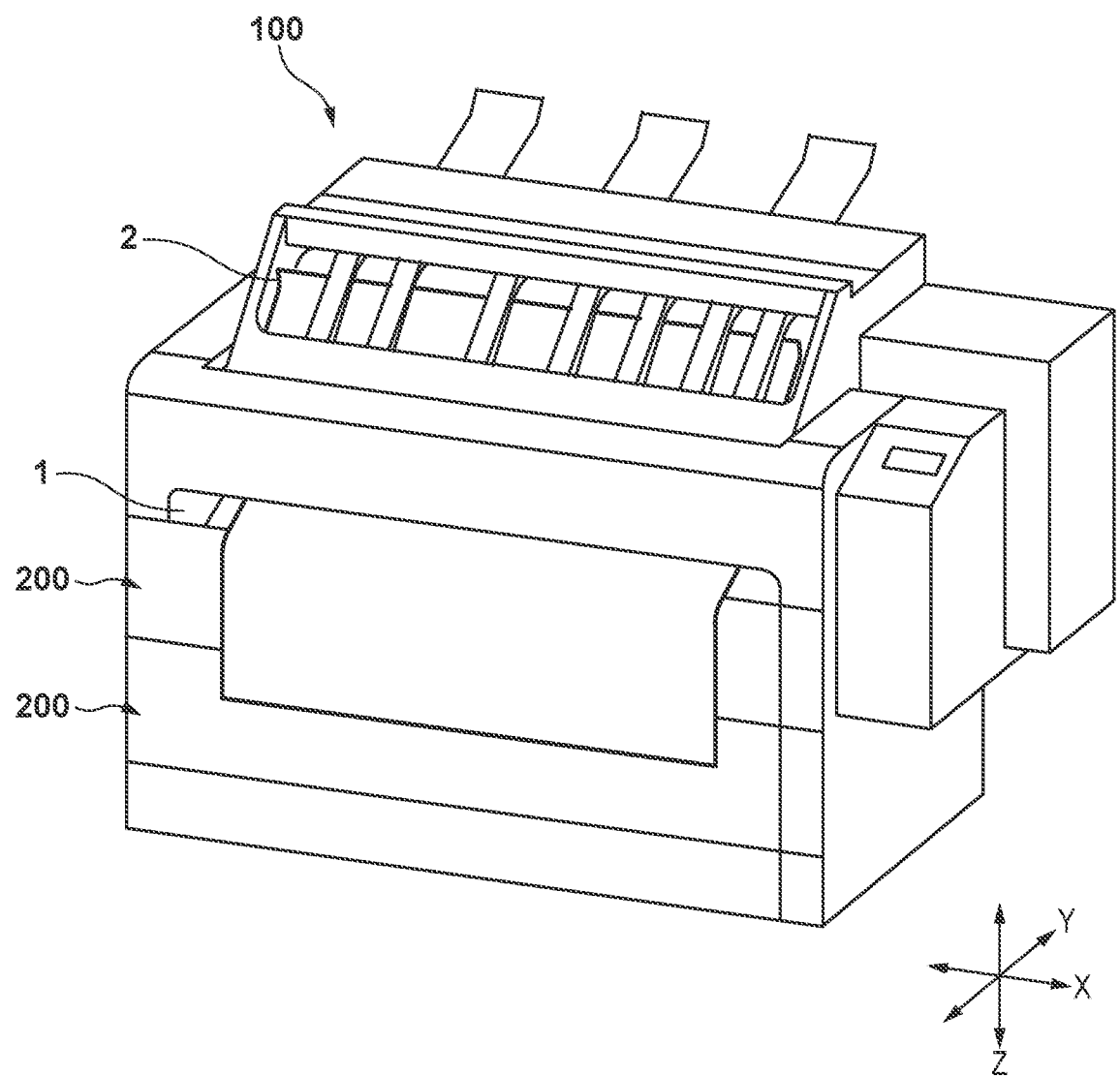
FIG. 1 is a perspective view illustrating an appearance of a printing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

In the above-described prior art, there are cases where processing for printing subsequent pages are also canceled when it is predicted that an error will occur in some pages of a printing product comprising a plurality of pages. However, if the processing is canceled without a user's choice, a result may not be in accordance with the user's intent. Meanwhile, when an event, such as an error in which printing cannot be executed as set, occurs for a plurality of times in one print job, it is also conceivable to prompt the user to select a response method each time; however, the user may feel that it is cumbersome.

According to the present disclosure, it is possible to provide a printing apparatus capable of executing processing according to a user's intent while reducing the user's operational input.

First Embodiment

<Overview of Printing Apparatus>

FIG. 1 is a perspective view illustrating an appearance of a printing apparatus 100 according to an embodiment. The printing apparatus 100 of the present embodiment is a so-called inkjet printing apparatus in which printing is performed by forming dots by discharging ink droplets onto a printing medium. The printing apparatus 100 includes rolled paper feeding apparatuses 200, which are examples of a feeding unit for feeding a printing medium on which printing has not been performed onto a conveyance path; an inkjet head 151 for discharging ink onto a printing medium; and a front discharge port 1 and a top discharge port 2, which are examples of a discharge unit for discharging a printing medium on which printing has been performed.

A rolled paper feeding apparatus 200 is capable of storing rolled paper serving as a printing medium, and is capable of feeding the stored rolled paper onto a conveyance path of the printing apparatus 100. Printing by the inkjet head 151 is performed on the rolled paper fed onto the conveyance path at a printing position on the conveyance path. The rolled paper on which printing has been performed by the inkjet head 151 is discharged from the printing apparatus 100 via the front discharge port 1 or the top discharge port 2. In the present embodiment, the front discharge port 1 discharges a printing medium from a front portion of the printing apparatus 100, and the top discharge port 2 discharges a printing medium from a top portion of the printing apparatus 100. In the present embodiment, rolled paper discharged from the front discharge port 1 is stored, for example, in a basket (not illustrated) or the like set on a front side of the printing apparatus 100. Further, rolled paper discharged from the top discharge port 2 is stacked on a stacking unit (stacker) of the printing apparatus 100. In the present embodiment, a main body cover 160 (see FIG. 3) functions as the stacking unit (stacker). In the following description, discharge from the front discharge port 1 is sometimes referred to as "front discharge" or "discharge from the front", and discharge from the top discharge port 2 is sometimes referred to as "top discharge" or "discharge from the top".

FIG. 1 illustrates the printing apparatus 100, which includes only a printing function; however, the printing apparatus 100 may be an apparatus further including a reading apparatus for reading an image on a document so as to function as a copy machine, a multifunction peripheral including other functions, or the like.

Further, the rolled paper feeding apparatuses 200 for storing a rolled sheet (rolled paper) are illustrated here as feeding units for feeding a printing medium on which printing has not been performed; however, feeding units for stacking and storing cut sheets (cut paper) and feeding a cut sheet onto a conveyance path may be provided. For example, in the printing apparatus 100 of FIG. 1, it may be possible to remove the rolled paper feeding apparatuses 200 and mount feeding units for feeding a cut sheet. Alternatively, some of a plurality of feeding units provided in the printing apparatus 100 may feed a rolled sheet onto the conveyance path, and the rest may feed a cut sheet onto the conveyance path. That is, the printing apparatus 100 may be capable of selectively feeding a rolled sheet and a cut sheet onto the conveyance path.

<Configuration of Printing Apparatus>

Figure 2:
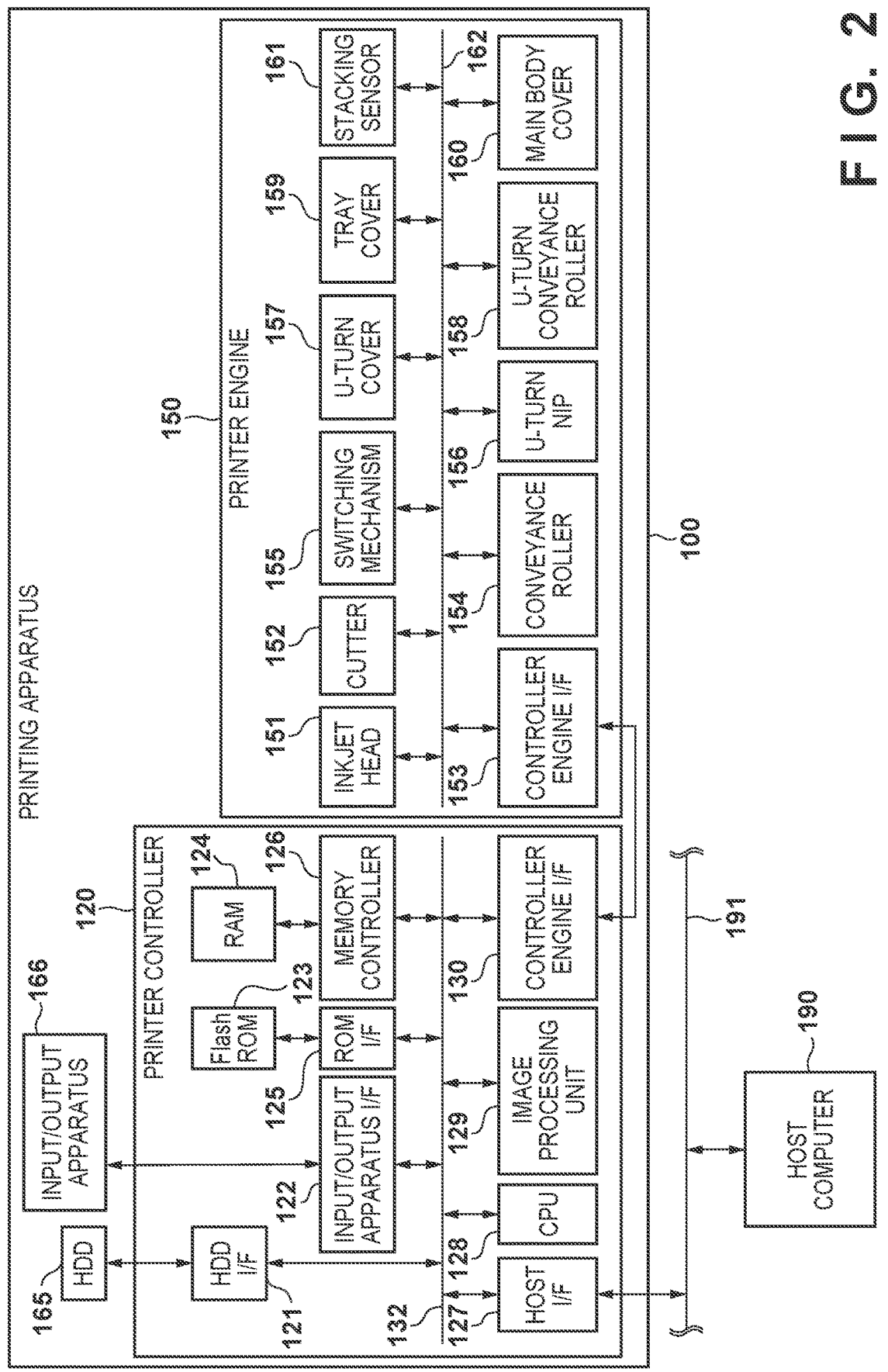
FIG. 2 is a block diagram illustrating a configuration of the printing apparatus.

FIG. 2 is a block diagram illustrating a configuration of the printing apparatus 100. The printing apparatus 100 includes a printer controller 120, a printer engine 150, a hard disk drive (HDD) 165, and an input/output apparatus 166. The printing apparatus 100 may also be connected to a host computer 190 via a network 191. First, the printer controller 120 related to control of the printing apparatus 100, the HDD 165, the input/output apparatus 166, and the host computer 190 capable of communicating with the printing apparatus 100 will be described.

The printer controller 120 includes an HDD interface (HDD I/F) 121, an input/output apparatus interface (input/output apparatus I/F) 122, a read only memory (ROM) interface (ROM I/F) 125, and a memory controller 126. The printer controller 120 includes a host interface (host I/F) 127, a CPU 128, an image processing unit 129, and a controller engine interface (controller engine I/F) 130. These are connected via a printer controller system bus 132. The printer controller 120 also includes a flash ROM 123 and a random access memory (RAM) 124, each being connected to the printer controller system bus 132 via a ROM I/F 125 and the memory controller 126.

The CPU 128 is a central processing unit in a form of a microprocessor (microcomputer) and controls the operation of the entire printing apparatus 100 by executing a program and starting up hardware. The flash ROM 123 stores fixed data necessary for the program to be executed by the CPU 128 and various operations of the printing apparatus 100.

The RAM 124 is used as a work area of the CPU 128 and a temporary storage region for various kinds of received data, and stores various kinds of setting data.

The image processing unit 129 performs various kinds of image processing. For example, the image processing unit 129 performs processing for expanding (converting) printing data (e.g., data represented in a page description language) handled by the printing apparatus 100 into image data (bitmap image data) and other kinds of image processing. For example, the image processing unit 129 converts a color space (e.g., YCbCr) of image data included in inputted printing data into a standard RGB color space (e.g., sRGB). For example, the image processing unit 129 converts image data whose color space is sRGB into image data whose color space for ink colors (CMYK color space). The image processing unit 129 performs as necessary various kinds of image processing, such as conversion of resolution to the number of effective pixels (for which the printing apparatus 100 can perform print processing), image analysis, and image correction, on image data. Image data obtained by these kinds of image processing is stored in the RAM 124 or the HDD 165.

The HDD 165 stores the program to be executed by the CPU 128, printing data, setting information necessary for various operations of the printing apparatus 100, and the like. The CPU 128 can execute various kinds of processing by reading out information stored in the HDD 165. Another large-capacity storage apparatus, such as a solid state drive (SSD), may be employed in place of the HDD 165.

The input/output apparatus 166 accepts operational input from the user and displays various kinds of information to the user. For example, the input/output apparatus 166 may include a physical key and a touch panel operable by the user as an input apparatus. The input/output apparatus 166 also includes a display unit, such as a liquid crystal display or an organic EL display, for presenting (notifying) various kinds of information to the user as an output apparatus. The input/output apparatus 166 can also present information to the user by outputting audio (such as a buzzer or sound) based on audio information from a sound generator.

In the present embodiment, it is assumed that the printing apparatus 100 includes the input/output apparatus 166; however, the user may instruct the printing apparatus 100 or receive a notification from the printing apparatus 100 via an external apparatus. For example, the user may operate the printing apparatus 100 or confirm various kinds of information of the printing apparatus 100 using an input/output apparatus of the host computer 190, which is capable of communicating with the printing apparatus 100 via the network 191. In addition, a plurality of input/output apparatuses and the printing apparatus 100 may be capable of connecting via the network 191 or the like.

The host computer 190 is, for example, an external apparatus that is a source from which printing data is to be supplied, and is capable of communicating with the printing apparatus 100 via the network 191. The host computer 190 is, for example, an information processing apparatus, such as a typical personal computer (PC). Another source from which printing data is to be supplied, such as a reader for reading an image, a digital camera, or a smartphone may be connected to the printing apparatus 100 in place of the host computer 190.

Figure 3:
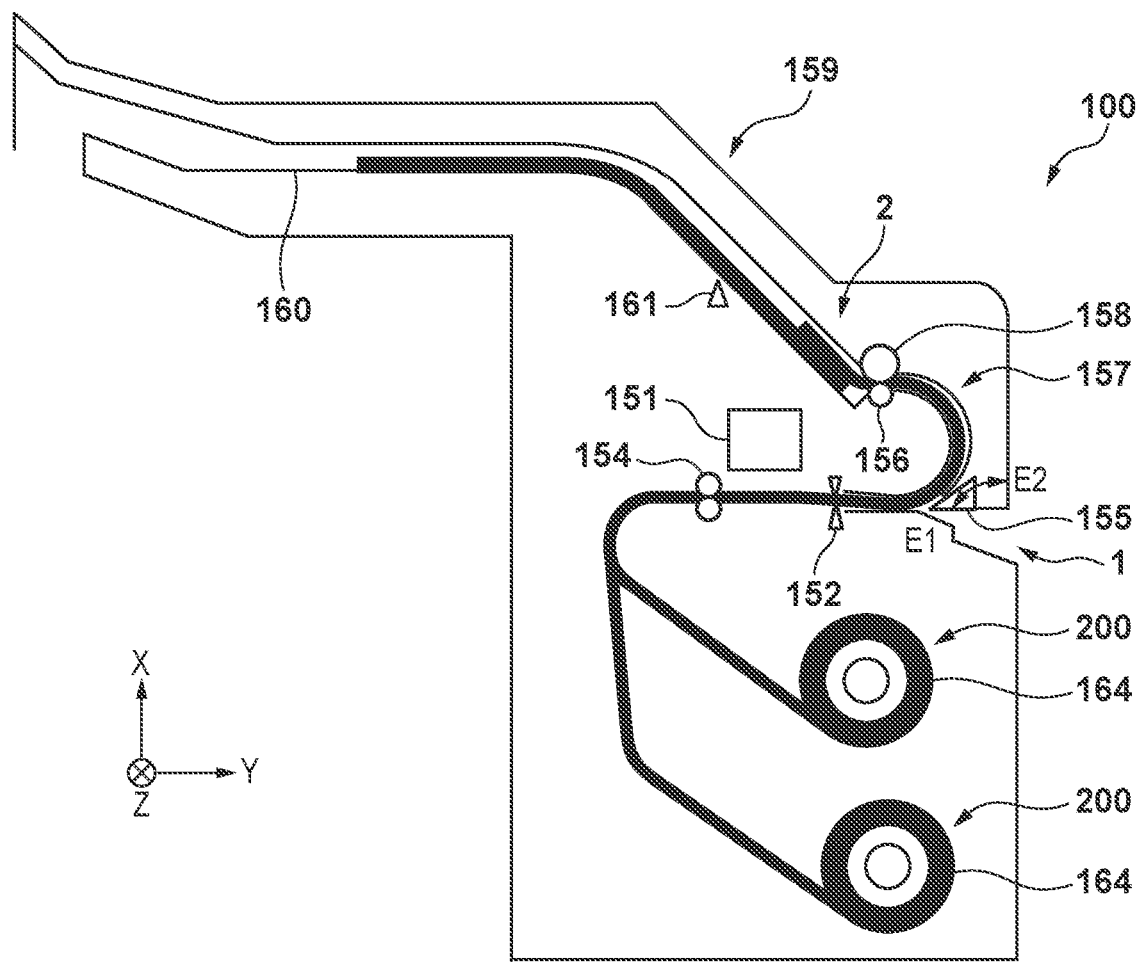
FIG. 3 is a cross-sectional diagram illustrating an internal structure of the printing apparatus.

Next, an internal structure of the printing apparatus 100 will be described with reference also to FIG. 3. FIG. 3 is a cross-sectional diagram illustrating an internal structure of the printing apparatus 100. FIG. 3 illustrates a state in which rolled paper 164 is set in the rolled paper feeding apparatuses 200.

The printer engine 150 includes the inkjet head 151, a cutter unit 152, and a controller engine interface (controller engine I/F) 153. The printer engine 150 further includes a conveyance roller 154, a switching mechanism 155, a U-turn nip 156, a U-turn cover 157, a U-turn conveyance roller 158, a tray cover 159, the main body cover 160, and a stacking sensor 161. These components are connected to each other via a printer engine system bus 162.

The inkjet head 151 is a printing unit for printing an image and prints an image onto a sheet based on image data. The inkjet head 151 is configured by, for example, a plurality of colors' worth of printheads, and discharges ink from the printheads to form an image on a sheet in synchronization with conveyance of the sheet. The printing apparatus 100 of the present embodiment employs a serial printing method. That is, the printing apparatus 100 performs printing on rolled paper by repeating conveyance of rolled paper by a predetermined amount in a Y direction of FIG. 1 and discharge of ink while driving the inkjet head 151 filled with ink in an X direction of FIG. 1. However, a linehead printhead can also be employed.

The cutter unit 152 is a mechanism for cutting a sheet. The cutter unit 152, for example, cuts a printing medium (e.g., a rolled sheet) on which printing has been performed to a predetermined length. The conveyance roller 154 is a roller for conveying a printing medium and is controlled by the CPU 128.

The switching mechanism 155 is a mechanism for switching conveyance paths of a printing medium. The switching mechanism 155 is provided on a conveyance path further downstream of a position at which printing is performed by the inkjet head 151, and is capable of changing between a position E2 for guiding the rolled paper 164 to the front discharge port 1 and a position E1 (a position illustrated in FIG. 3) for guiding the rolled paper 164 to the top discharge port 2. The switching mechanism 155 is controlled by the CPU 128.

The U-turn nip 156 is a mechanism for holding a printing medium when discharging the printing medium from the top discharge port 2. The U-turn cover 157 is a material for forming a conveyance path for when discharging a printing medium from the top discharge port 2. The U-turn conveyance roller 158 is a roller for conveying a printing medium when discharging a printing medium from the top discharge port 2 and is controlled by the CPU 128.

The main body cover 160 is a mechanism on which a printing medium is stacked when the printing medium is discharged from the top discharge port 2 to the top of the printing apparatus 100. The printing medium stacked on the main body cover 160 is held from above by the tray cover 159. That is, the main body cover 160 is an example of the stacking unit for stacking a printing medium discharged from the top discharge port 2.

The stacking sensor 161 detects a stacking state of printing media on the main body cover 160. For example, the stacking sensor 161 detects whether there is a printing medium on the main body cover 160 and whether an amount of printing media on the main body cover 160 exceeds a predetermined amount (whether the main body cover 160 is fully stacked). It is possible to use as appropriate a known technique as the stacking sensor 161; however, for example, an optical sensor may be used, in which case the CPU 128 can determine whether a printing medium is stacked on top of the main body cover 160 or whether a stacking amount has exceeded a predetermined amount in accordance with whether light is blocked from the stacking sensor 161 or light passes through to the stacking sensor 161. Further, for example, the stacking sensor 161 may be capable of detecting a weight of printing media stacked on the stacking unit (main body cover 160). In this case, the CPU 128 can determine whether the weight of the stacked printing media is a predetermined value or more based on a result of detection of the stacking sensor 161, more specifically, whether the stacking unit (main body cover 160) is fully stacked.

<Overview of Operation of Printing Apparatus>

An overview of a printing operation according to the printing apparatus 100 will be described with reference to FIG. 3. When the rolled paper 164 is fed from a rolled paper feeding apparatus 200 to the conveyance path of the printing apparatus 100, a leading end in a conveyance direction of the rolled paper 164 is conveyed by the conveyance roller 154 to a position facing the inkjet head 151, that is, a position at which printing is performed by the inkjet head 151. Ink is discharged from the inkjet head 151 in that state, and an image is printed on the rolled paper at the printing position. After printing has been performed by the inkjet head 151, the rolled paper 164 is further conveyed for a predetermined amount by the conveyance roller 154. Thereafter, an operation of discharging ink from the inkjet head 151 and a conveyance operation by the conveyance roller 154 are repeated until a trailing edge of the image is printed on the rolled paper 164.

When discharging the rolled paper 164 on which printing has been performed from the front discharge port 1, the switching mechanism 155 is moved to the position E2 before a start of the ink discharge operation by the inkjet head 151. By this, the leading end of the rolled paper 164 is discharged from the front discharge port 1 of the printing apparatus 100.

Meanwhile, when discharging the rolled paper 164 on which printing has been performed from the top discharge port 2, the switching mechanism 155 is moved to the position E1 before a start of the ink discharge operation by the inkjet head 151. By this, the conveyance path to the front discharge port 1 is blocked, and the leading end of the rolled paper 164 is conveyed to the top discharge port 2 side along the switching mechanism 155.

Once an image has been printed up to a trailing edge of the image, if cutting is necessary based on a cutting mode setting in print settings, a portion of the rolled paper 164 at the trailing edge of the image is cut by the cutter unit 152. The printing medium that has been cut at the portion at the trailing edge of the image is sandwiched between the U-turn conveyance roller 158 and the U-turn nip 156, conveyed in the U-turn cover 157, and discharged between the tray cover 159 and the main body cover 160 via the top discharge port 2.

When a printing medium is discharged from the top discharge port 2, the stacking sensor 161 detects that the printing medium is stacked in the stacking unit of the printing apparatus 100.

As described above, in a case of top discharge, a printing medium on which printing has been performed is discharged to the top of the printing apparatus 100 through the U-turn cover 157. However, in a case of a relatively rigid printing medium, such as a cardboard, it may not be possible to perform top discharge due to it being difficult to convey the printing medium through the U-turn cover 157. Meanwhile, in a case of front discharge, a printing medium can be discharged without passing the U-turn cover 157, and so, it is basically possible to discharge a relatively rigid printing media, such as a cardboard. That is, even if a plurality of units for discharging a printing medium are provided, it may be difficult to discharge a printing medium from a specific discharge unit depending on conditions, such as a characteristic (e.g., high rigidity) of a printing medium and a shape of a conveyance path up to the discharge unit.

Further, when the cutting mode setting is set to "no cutting", if a printing medium on which printing has been performed is discharged to the top of the printing apparatus 100 without being cut, it may become difficult to handle the printing medium thereafter, and it may be very burdensome for the user. Therefore, in the printing apparatus 100 according to the present embodiment, in a case of top discharge, it is necessary that the cutting mode setting is set to "cutting". Meanwhile, in a case of front discharge, even if a printing medium is discharged without being cut, it is easier to handle the printing medium thereafter than in a case of top discharge, and so it is possible to discharge the printing medium even if the cutting mode is set to "no cutting".

A printing medium discharged from the top discharge port 2 is stacked on the main body cover 160, which is an example of the stacking unit; however, when the amount of printing media stacked on the main body cover 160 exceeds a stackable amount of the main body cover 160, it may be difficult to discharge more printing media from the top discharge port 2.

As described above, in the printing apparatus 100 according to the present embodiment, a situation in which a printing medium cannot be discharged (it is better not to perform discharge) from the top discharge port 2 may occur depending on various conditions, such as a type of a printing medium, various settings such as the cutting mode setting, and the stacking amount of the stacking unit. However, if a print job being executed is uniformly canceled when such a situation occurs, it may not be possible to execute processing according to the user's intent. In addition, if a response is to be accepted from the user each time such a situation occurs, the user may feel that it is cumbersome. Therefore, in the present embodiment, the following processing is executed in order to execute processing according to the user's intent while reducing the user's operational input.

<Example of Processing>

Figure 4A:
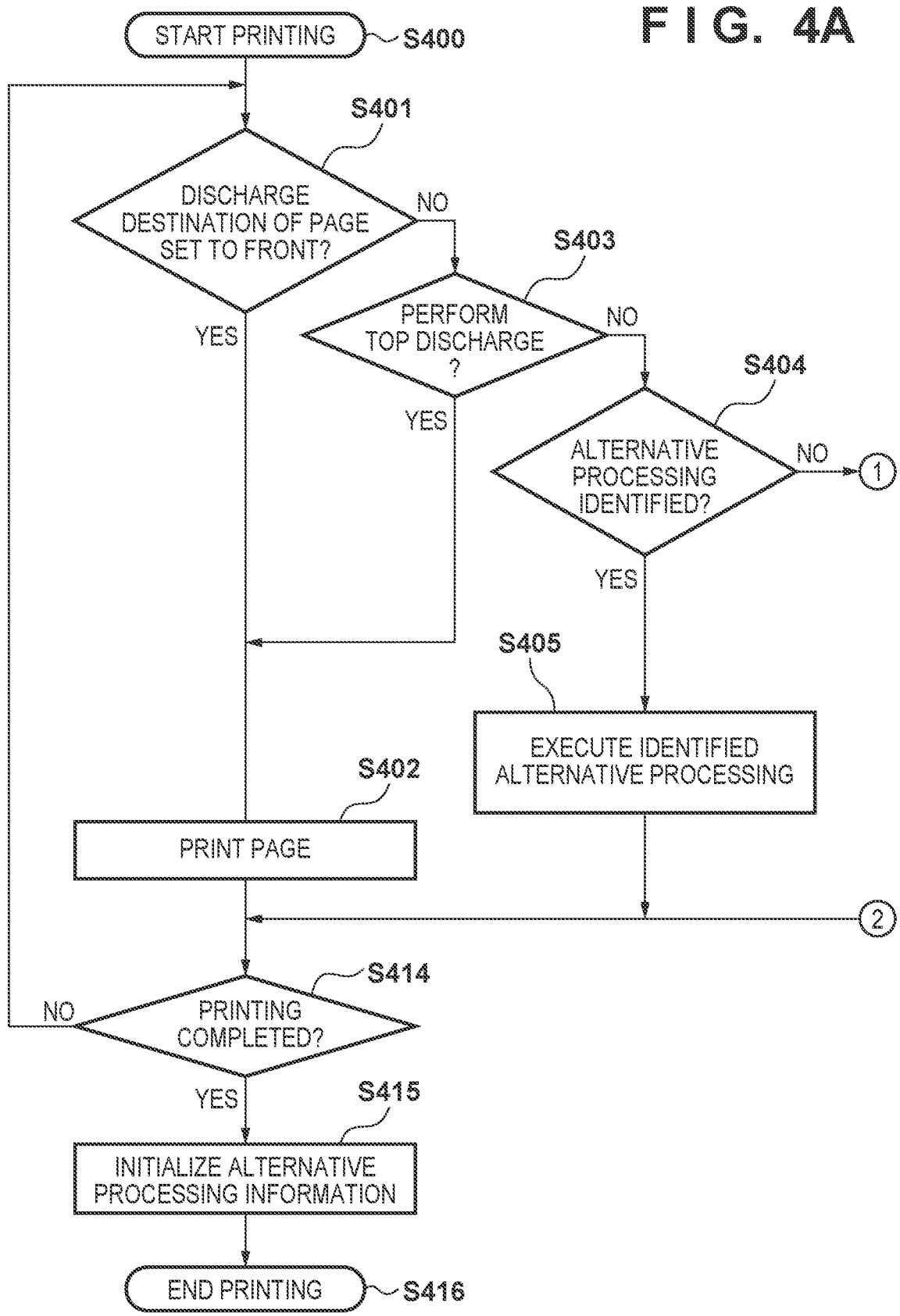
FIGS. 4A and 4B are flowcharts for explaining an example of processing of a CPU.
Figure 4B:
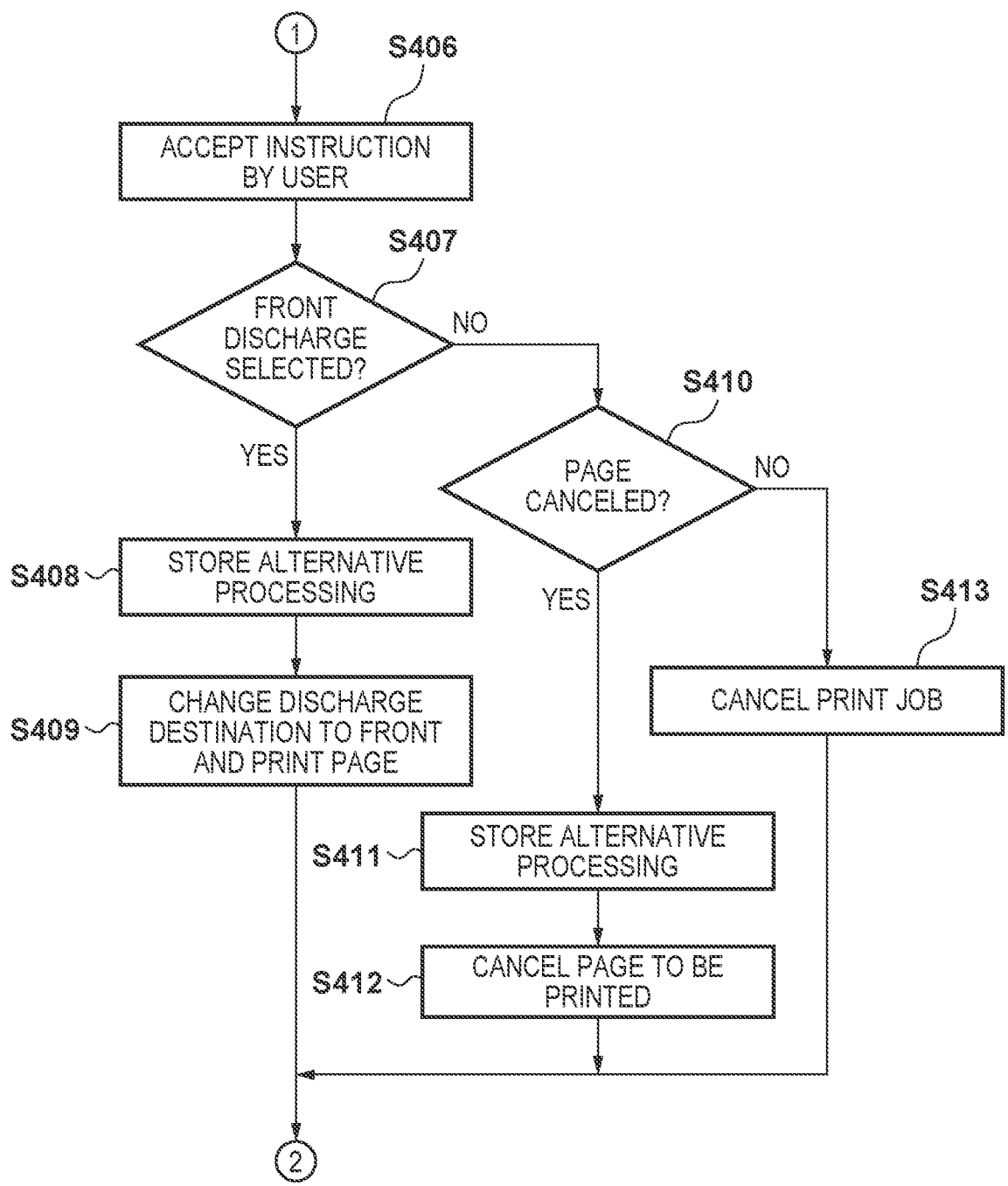

FIGS. 4A and 4B are flowcharts for explaining an example of processing of the CPU 128. For example, the program of the present flowchart is held in the flash ROM 123 and executed by the CPU 128. In addition, a form may be taken so as to install a program similar to that of the present flowchart in the RAM 124 and execute the program by the CPU 128.

In the following, a print command issued by the user to the printing apparatus 100 is called a print job. In addition, the print job may include a plurality of pages. Each page may be, for example, a section from where it is determined whether cutting is to be performed by the cutter unit 152 based on the cutting mode setting until where is next determined whether cutting is to be performed. In addition to image data for each page to be printed, it is assumed that the print job also includes setting information related to printing, such as a discharge destination of a printing medium and the cutting mode.

Upon receiving a print job from the host computer 190 via the network 191, the CPU 128 starts the present flowchart (step S400).

In step S401, the CPU 128 confirms a setting for a discharge destination of a page; if the discharge destination is set to the front, the CPU 128 proceeds to step S402; otherwise, the CPU 128 proceeds to step S403. For example, the CPU 128 determines a setting for the discharge destination based on setting information of the present print processing included in the print job received in step S400 or setting information of the printing apparatus 100 stored in the HDD 165 or the like of the printing apparatus 100. If the discharge destination is set to the front discharge port 1, the CPU 128 proceeds to step S402; if the discharge destination is set to the top discharge port 2, the CPU 128 proceeds to step S403.

In step S402, the CPU 128 prints the page and proceeds to step S414. Meanwhile, when the processing proceeds to S403, the CPU 128 determines whether to discharge the page from the top; when the page is to be discharged from the top, the CPU 128 proceeds to step S402 and prints the target page; otherwise, the CPU 128 proceeds to step S404. In the printing apparatus 100 of the present embodiment, a page can basically be discharged from the front discharge port 1 regardless of conditions, such as a type of a printing medium, various settings, and a state of the stacking unit. Therefore, when the setting for the discharge destination is the front discharge port 1, the CPU 128 directly proceeds to printing the page (step S401→step S402). Meanwhile, in the printing apparatus 100 of the present embodiment, it may not be possible to discharge (or may be better not to discharge) a page from the top discharge port 2 depending on the above-described conditions. Therefore, when the top discharge port 2 is instructed as the discharge destination, when it is determined to discharge the page from the top based on a predetermined condition, the CPU 128 proceeds to print the page (step S401→step S403→step S402). After processing in step S402, the CPU 128 proceeds to step S414.

Figures 5, 6:
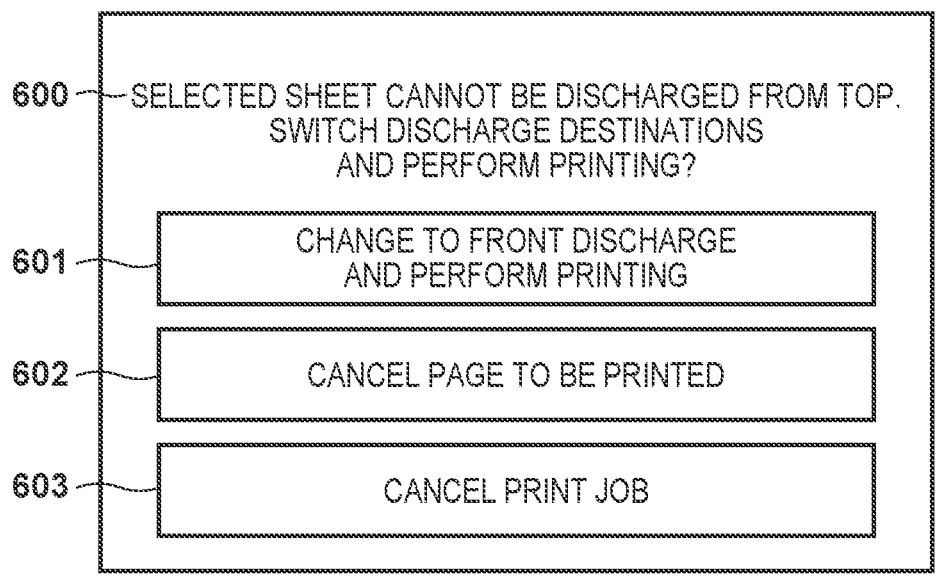
FIG. 5 is a diagram illustrating an example of conditions for whether to discharge a page from a top discharge port.
FIG. 6 is a diagram illustrating an example of a screen for selecting alternative processing.

Here, FIG. 5 is a diagram illustrating an example of conditions for whether to discharge a page from the top discharge port 2. In the present embodiment, the CPU 128 determines whether to discharge a page from the top discharge port 2 based on a type of a printing medium, the cutting mode, a form in which the printing medium is fed, and a stacking state of the main body cover 160 (the stacking unit) (step S403).

For example, if a type of a printing medium is plain paper, the CPU 128 determines to perform top discharge, and when the type of the printing medium is cardboard, the CPU 128 determines not to perform top discharge. As described above, in a case of cardboard, which is more rigid than plain paper, it may be difficult to pass the paper through the U-turn cover 157. Therefore, the cardboard is discharged not from the top but from the front, thereby making it possible to prevent the paper from jamming on the conveyance path, for example. That is, the CPU 128 determines the discharge destination based on information related to a rigidity of a printing medium. By this, in a case such as that in which it is difficult to discharge a relatively rigid printing medium from a specific discharge unit due to a structure or the like of the conveyance path, by restricting discharge from that discharge unit, it is possible to prevent a jam from occurring on the conveyance path, for example. In particular, in a case of top discharge, it is often necessary to provide a reversal in the conveyance path after the printing position, resulting in a tighter bend in the printing medium during conveyance than in a case of front discharge, and so, it may be difficult to convey a printing medium. Therefore, by discharging a rigid printing medium not from the top but from the front, the printing medium can be discharged avoiding a conveyance path through which conveyance is difficult. The information related to the rigidity of the printing medium includes a material, thickness, grammage, density, and the like of the printing medium.

For example, if a form in which a printing medium is fed is rolled paper (a rolled sheet), the CPU 128 determines to perform top discharge; if the form in which the printing medium is fed is cut paper (a cut sheet), the CPU 128 determines not to perform top discharge. That is, when a cut sheet is fed to the printing position from a unit for feeding a printing medium, the CPU 128 determines not to discharge the printing medium from the top discharge port 2. Settings are made so as not to perform top discharge for cut paper, taking into account difficulties in conveying a printing medium on the conveyance path leading to top discharge.

Further, for example, if the mode for cutting a printing medium by the cutter unit 152 is "cutting", the CPU 128 determines to perform top discharge; if the mode for cutting a printing medium is "no cutting", the CPU 128 determines not to perform top discharge. That is, the CPU 128 determines whether to discharge a printing medium from the top discharge port 2 based on a method for cutting the rolled sheet by the cutter unit 152. This is because if top discharge is performed without a sheet being cut by the cutter unit 152, it is difficult to handle the discharged sheet, and convenience may be hindered.

For example, if a unit for stacking a printing medium for which top discharge has been performed is not fully stacked, the CPU 128 determines to perform top discharge; if the stacking unit is fully stacked, the CPU 128 determines not to perform top discharge. This is to prevent paper from jamming due to over stacking of sheets in the stacking unit. The CPU 128 may determine whether to perform top discharge based on whether the stacking amount of the stacking unit has reached a predetermined amount instead of whether the stacking unit is fully loaded. These determinations may be made based on a result of detection of the stacking sensor 161.

When it is determined in step S403 not to perform top discharge based on any of these conditions, the CPU 128 proceeds from step S403 to step S404. The conditions for whether to perform top discharge may include conditions other than the above or need not include any one or more of the above. The conditions for whether to perform top discharge may be internally stored in the printing apparatus 100 or a configuration may be taken so as to be able to add or delete as appropriate a condition from the input/output apparatus 166 or an external apparatus, such as the host computer 190.

The description of FIGS. 4A and 4B is returned to. When the processing proceeds from S403 to step S404, the CPU 128 identifies previously instructed alternative processing. If the alternative processing is identified, the CPU 128 proceeds to step S405; if the alternative processing is not identified, the CPU 128 proceeds to step S406. Here, the alternative processing is processing to be performed in place of top discharge when the CPU 128 determines not to discharge a printing medium from the top discharge port 2. In other words, it can be said that the alternative processing is processing for resolving an error when an error in which top discharge is not performed occurs. Further, here, it is assumed that the alternative processing can be stored in a storage unit, such as the RAM 124 or the HDD 165. When the alternative processing is stored in the storage unit, the CPU 128 deems that the alternative processing previously instructed by the user is identified based on the stored information and proceeds to step S405; when the alternative processing is not stored, the CPU 128 proceeds to step S406.

Further, as will be described later, in the present embodiment, the previously instructed alternative processing is alternative processing previously instructed within the same print job.

In step S405, the CPU 128 executes the alternative processing identified in step S404. The alternative processing includes, for example, printing the page with the discharge destination of a printing medium switched to the front discharge port 1, canceling the page to be printed, and the like. In the present embodiment, when the alternative processing previously indicated by the user is identified, the CPU 128 executes the identified alternative processing. This makes it unnecessary to request the user for an instruction each time it becomes necessary to execute alternative processing and makes it possible to efficiently execute print processing. Further, the user does not need to instruct alternative processing multiple times, and so, convenience of the print processing is improved. After processing in step S405, the CPU 128 proceeds to step S414.

In step S406, the CPU 128 accepts an instruction for alternative processing by the user. More specifically, when the alternative processing previously indicated by the user is not identified (No in step S404), the CPU 128 accepts an instruction for alternative processing from the user. For example, the CPU 128 receives an instruction from the user via the input/output apparatus 166 by prompting the user to make a selection by presenting options for alternative processing on the display unit of the input/output apparatus 166.

FIG. 6 is a diagram illustrating an example of a screen for selecting alternative processing. This selection screen is displayed, for example, on the display unit included in the input/output apparatus 166. For example, when top discharge cannot be performed due to a printing medium being cardboard, a message 600, such as "The selected sheet cannot be discharged from the top. Switch discharge destinations and perform printing?", will be displayed on the selection screen.

In addition, options 601 to 603 for alternative processing are displayed on this selection screen. The option 601 is an option to "change to front discharge and perform printing". The option 602 is an option to "cancel the page to be printed." The option 603 is an option to "cancel the print job." If the user selects the option 601, the CPU 128 switches the discharge destination of the page to be printed to the front and continues printing. When the user selects the option 602, the CPU 128 cancels only that page. When the user selects the option 603, the CPU 128 cancels the entire print job that includes that page. Here, the option 602 of canceling only the current page to be printed is provided since print settings can be set for each page. That is, the CPU 128 may determine to perform top discharge for the next and subsequent pages. The options 601 to 603 are illustrative, and any one or more of these options need not be included, and other options may be included. For example, there may be two options: "change to front discharge and perform printing" and "cancel the print job". For example, when it is necessary to select alternative processing due to the main body cover 160 being fully stacked, an option for eliminating the cause, which is printing media discharged to the top discharge port 2, such as "remove the printing media stacked on the main body cover 160", may be included.

Here, it is assumed that options for alternative processing are displayed on the input/output apparatus 166 of the printing apparatus 100 and the user's instruction can be received. However, the CPU 128 may accept the user's instruction for alternative processing via an external apparatus, such as the host computer 190. For example, the CPU 128 transmits a command for selecting alternative processing to the host computer 190 via the host I/F 127. The host computer 190 that has received the command displays a selection screen, such as the one illustrated in FIG. 6, on its display unit or a connected display unit and accepts the user's instruction. The host computer 190 then transmits information on the accepted user instruction to the printing apparatus 100. The CPU 128 accepts the instruction transmitted from the host computer 190 via the host I/F 127. That is, a form may be employed so as to perform specific processing for accepting an option from a user on the host computer 190 side and receive information on the determined option from the host computer 190 on the printing apparatus 100 side.

The description of FIGS. 4A and 4B is returned to. In step S407, when the alternative processing selected by the user is "change to front discharge and perform printing", the CPU 128 proceeds to step S408; otherwise, the CPU 128 proceeds to step S410. When the processing proceeds to step S408, the CPU 128 stores information of the alternative processing selected by the user in a storage unit, such as the RAM 124 or the HDD 165. The information of the alternative processing stored here can be used at the time of processing for printing the next and subsequent pages. That is, the CPU 128 performs storage control in which the received information of the alternative processing is stored in the storage unit as information of the alternative processing previously instructed by the user. This makes it possible for the CPU 128 to proceed from step S404 to step S405 in processing for the next subsequent pages and perform alternative processing based on the user's previous instruction. Accordingly, processing is not interrupted for each page to present alternative processing to the user, and so, print processing can be executed efficiently. Then, in step S409, the CPU 128 changes the discharge destination to the front discharge port 1 and prints the page. After processing in step S409, the CPU 128 proceeds to step S414.

Meanwhile, when the processing proceeds from step S407 to step S410, when the alternative processing selected by the user is "cancel the page to be printed", the CPU 128 proceeds to step S411; otherwise, the CPU 128 proceeds to step S413.

When the processing proceeds to step S411, the CPU 128 stores information of the alternative processing selected by the user in a storage unit, such as the RAM 124 or the HDD 165, similarly to the case in step S408. Then, in step S412, the CPU 128 cancels the current page. After processing in step S412, the CPU 128 proceeds to step S414. Meanwhile, when the processing proceeds from step S410 to step S413, the CPU 128 cancels the print job itself and proceeds to step S415.

After processing has been performed in step S402, S405, S409 or S412, in step S414, the CPU 128 confirms whether printing has been completed; if printing has been completed, the CPU 128 proceeds to step S415; if printing has not been completed, the CPU 128 returns to step S401 and repeats the processing. For example, when the print job includes image data of a page next or subsequent to the page that has been printed or for which printing has been canceled, the CPU 128 determines that printing has not been completed. After printing has been completed, in step S415, the CPU 128 initializes the information of the alternative processing stored in a storage unit, such as the RAM 124 or the HDD 165. Then, the CPU 128 ends printing (step S416).

As described above, according to the present embodiment, when alternative processing previously instructed by the user is identified, that identified alternative processing is executed, and so, print processing in which the user's intent is reflected can be efficiently executed. Further, when the alternative processing previously instructed by the user is not identified, the CPU 128 executes alternative processing received from the user (step S404→step S406→step S409), and information of the alternative processing at this time is stored in a storage unit, such as the RAM 124 or the HDD 165. Therefore, it is not necessary for the user to instruct alternative processing for the next and subsequent pages, thereby making it possible to perform print processing that in which the user's intent is reflected with minimum user operation.

Here, a description has been given for an example in which information of alternative processing is held in the storage unit for a range of one print job and whether to perform top discharge is determined for each page; however, it is not necessary to initialize the information of the alternative processing for each print job. In addition, it may be determined whether to perform top discharge at another frequency, such as for each print job rather than for each page.

Second Embodiment

In a second embodiment, the CPU 128 causes the storage unit to hold information of alternative processing previously instructed by the user even after an end of a print job and executes alternative processing based on the information held in the storage unit in a print job for which execution has been instructed later by the same user. Hereinafter, descriptions will be omitted for a configuration, processing, and the like similar to the first embodiment.

Figure 7A:
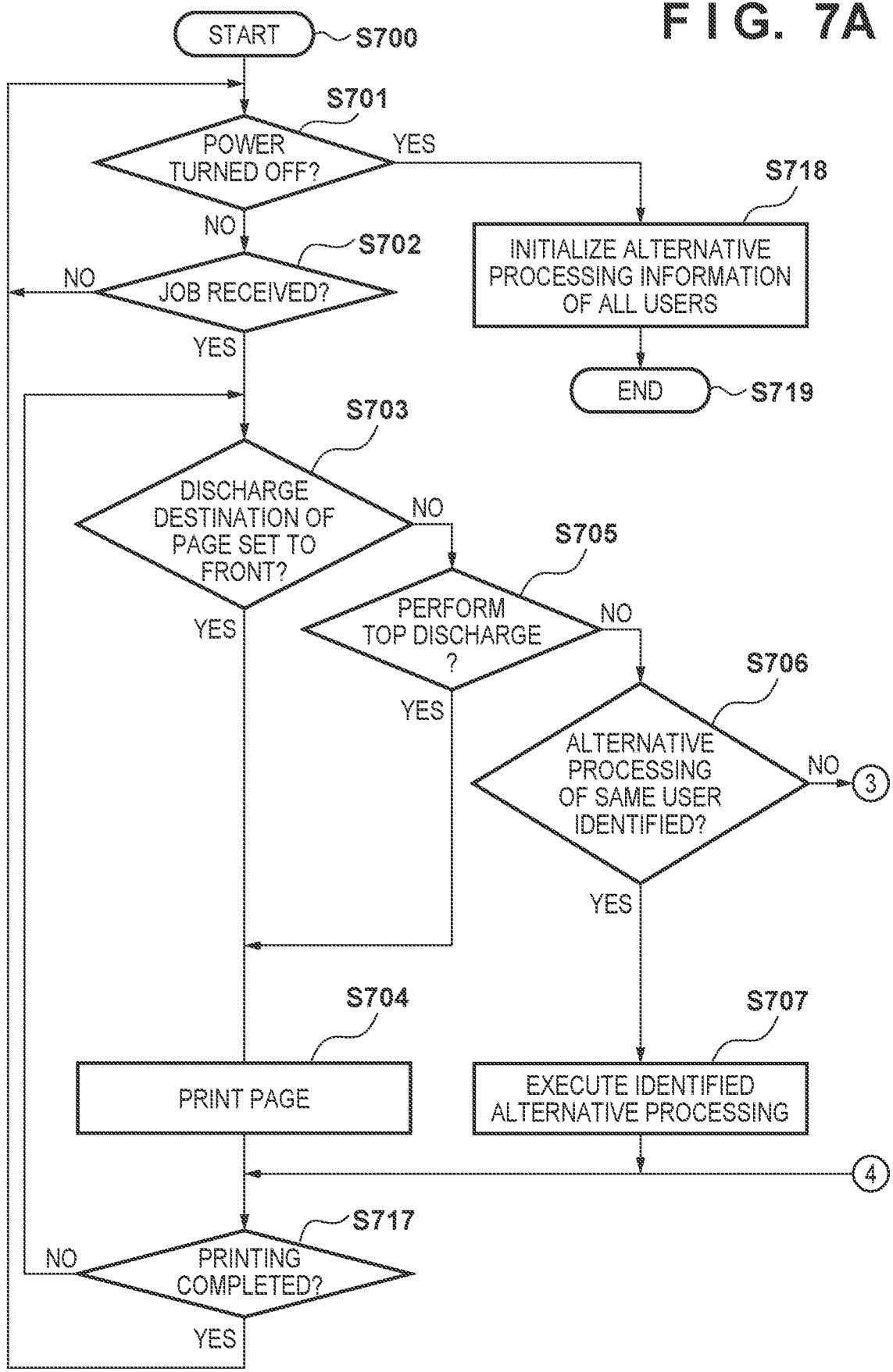
FIGS. 7A and 7B are flowcharts for explaining an example of processing of the CPU.
Figure 7B:
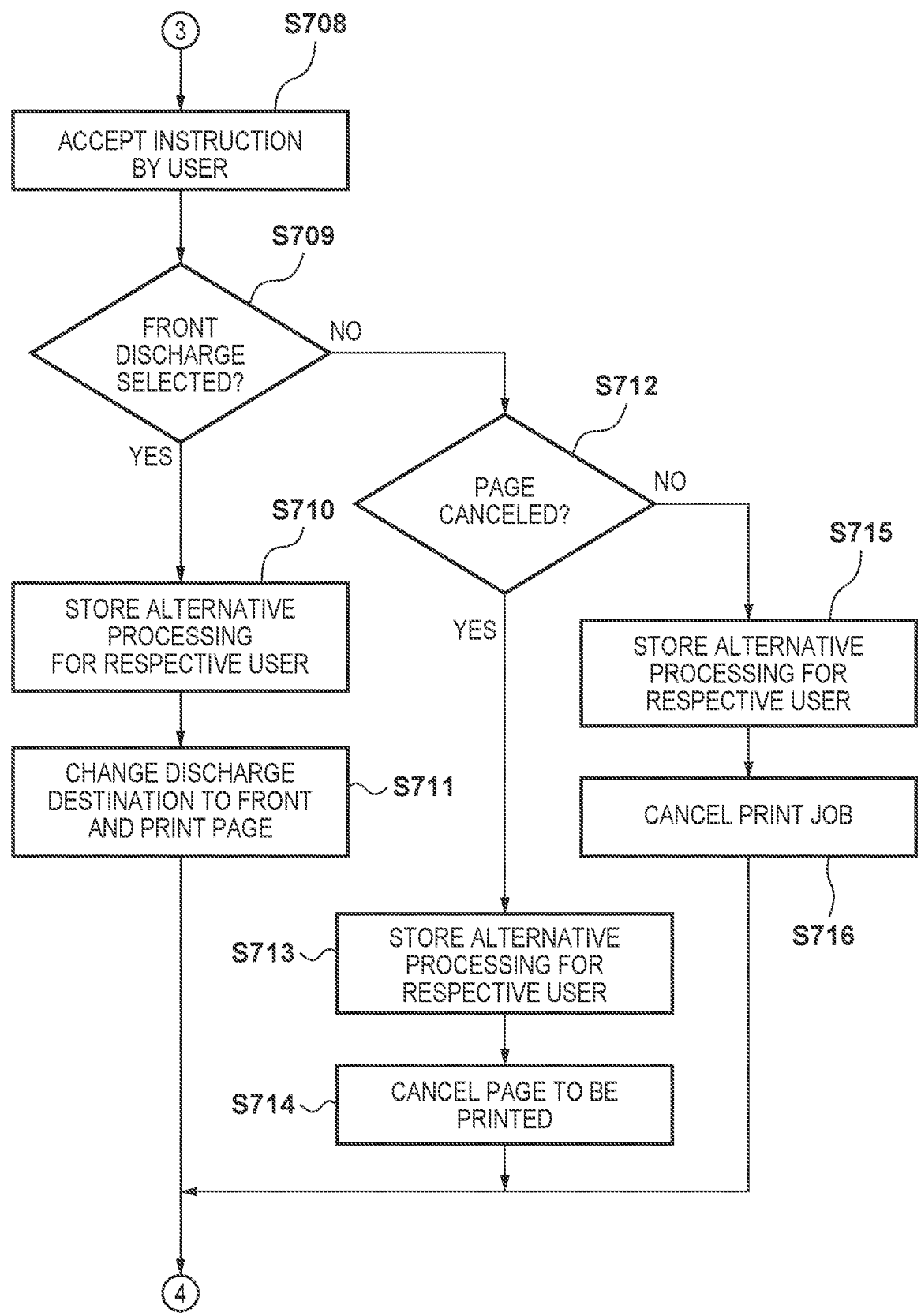

FIGS. 7A and 7B are flowcharts for explaining an example of processing of the CPU 128. The present flowchart starts when the power of the printing apparatus 100 is turned on (step S700).

In step S701, the CPU 128 confirms whether the power of the printing apparatus 100 has been turned off; if the power has been turned off, the CPU 128 proceeds to step S718; if the power has not been turned off, the CPU 128 proceeds to step S702.

In step S702, the CPU 128 confirms whether a print job has been received; if a print job has been received, the CPU 128 proceeds to step S703; if a print job has not been received, the CPU 128 returns to step S701. Descriptions will be omitted for step S703 to step S705 since processing is similar to that in step S401 to step S403, respectively.

When the processing proceeds from step S705 to step S706, the CPU 128 identifies alternative processing previously instructed by a user that is the same as the user that has instructed the current print job. When the alternative processing is identified, the CPU 128 proceeds to step S707; when the alternative processing is not identified, the CPU 128 proceeds to step S708. Based on information specifying a user included in the received current print job and information related to alternative processing stored in a storage unit, such as the RAM 124 or the HDD 165, the CPU 128 identifies the alternative processing previously instructed by the same user.

FIG. 8 is a diagram illustrating an example of a method for specifying a user in a print job. In the present embodiment, it is assumed that print settings of a print job are specified in an XML format. FIG. 8 is an example in which a job name (jobname), a username (username), and the number of copies (copies) are specified, and the print job is identified to be for a user "User1". In the present embodiment, it is assumed that print settings of a print job are in an XML format; however, the present invention is not limited to this and the specification method may be in another format.

Further, FIG. 9 is a diagram illustrating an example of information related to alternative processing stored in a storage unit, such as the RAM 124 or the HDD 165. In the present embodiment, an identification number, a username serving as identification information for identifying a user, alternative processing, and a storage date and time are stored in association. Here, the associated information can be stored for 10 users. FIG. 9 illustrates a state in which information for six users is stored. For example, when the number of users exceeds 10 users, it is assumed that a region of an identification number with the oldest storage date and time is used by being overwritten. A storage location is not limited to the RAM 124 or the HDD 165 and may be another storage medium. Further, the number of users that can be stored is not limited to 10 users.

In the examples illustrated in FIGS. 8 and 9, the CPU 128 identifies that the user that instructed the print job is "User1" based on the information included in the print job. The CPU 128 then identifies based on the information illustrated in FIG. 9 that the alternative processing previously instructed by "User1" is "change to front discharge and perform printing".

The description of FIGS. 7A and 7B is returned to. The processing for when the processing proceeds from step S706 to step S707 is similar to that in step S405. However, in the present embodiment, the CPU 128 executes the alternative processing previously instructed by the user who instructed printing of the print job being executed. Therefore, it is not necessary to prompt the user who instructed alternative processing when a print job was previously executed to instruct the alternative processing again during execution of the current print job. Thus, the CPU 128 is able to execute a print job more efficiently and perform alternative processing according to the user's intent. In addition, the processing in steps S708, S709 and S712 is similar to that in steps S406, S407 and S410, respectively.

When the processing proceeds from step S709 to step S710, the CPU 128 stores information of the alternative processing selected by the user in a storage unit, such as the RAM 124 or the HDD 165, for a respective user. Specifically, the CPU 128 stores in the storage unit the username, alternative process, and storage date and time illustrated in FIG. 9 in association. The processing in step S711 is similar to the processing in step S409.

The processing for when the processing proceeds from step S709 to step S712 is similar to that in step S410. When the processing proceeds from step S712 to step S713, the CPU 128 stores the information of the alternative processing selected by the user in a storage unit, such as the RAM 124 or the HDD 165, for a respective user, similarly to in step S710. The processing in step S714 is similar to that in step S412.

When the processing proceeds from step S712 to step S715, the CPU 128 stores information of the alternative processing selected by the user in a storage unit, such as the RAM 124 or the HDD 165, for a respective user, similarly to in steps S710 and S713. In step S716, the CPU 128 cancels the print job being executed.

The processing in step S717 after the processing has been performed in step S704, S707, S711, S714 or S716 is similar to that in step S414. However, when it is determined that printing has been completed in step S717, the CPU 128 returns to step S701. That is, unless the power of the printing apparatus 100 is turned off, the processing in step S703 to step S717 is performed each time a print job is received.

When the processing proceeds from step S701 to step S718, the CPU 128 initializes the information of the alternative processing stored in a storage unit, such as the RAM 124 or the HDD 165. The CPU 128 then ends the present flowchart (step S719) and the printing apparatus 100 is shut down.

As described above, according to the present embodiment, when alternative processing previously instructed by one user is identified, the CPU 128 executes the identified alternative processing. The information of the alternative processing previously instructed by one user is held in a storage unit, such as the RAM 124 or the HDD 165, while the power of the printing apparatus 100 is on. This makes it such that regarding a discharge destination of a printing medium, an option need only be selected once from a power on to power off so long as a print job is of one user. Therefore, it is possible to reflect the user's intent and continue print processing while saving the user the effort of performing selection. In the present embodiment, a configuration is taken so as to determine print settings for printing of each page; however, determination may be performed for each job.

Third Embodiment

Figure 10:
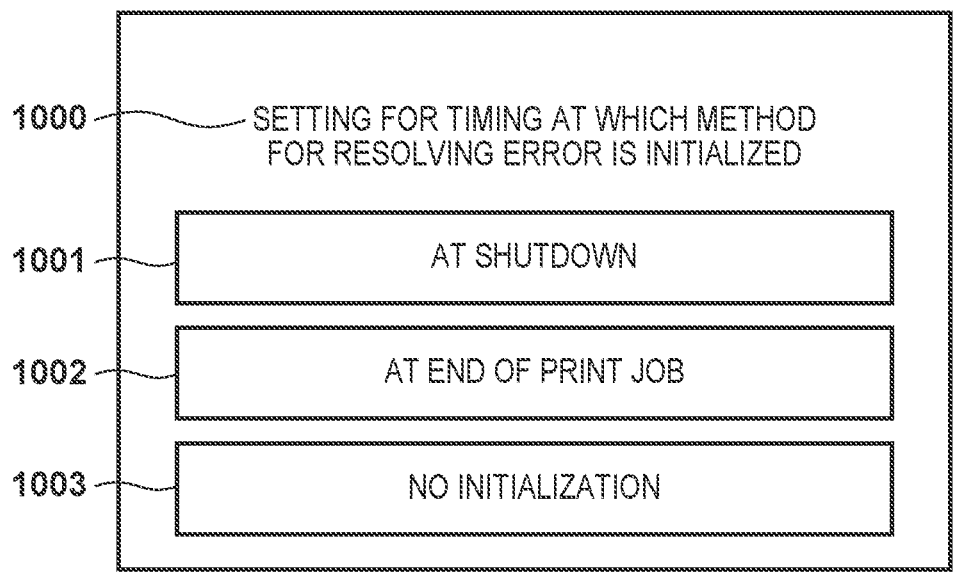
FIG. 10 is a diagram illustrating an example of a screen for setting a timing at which information of alternative processing is initialized.

In a third embodiment, it is possible to change the timing at which the CPU 128 initializes information of alternative processing stored in a storage unit, such as the RAM 124 or the HDD 165. FIG. 10 is a diagram illustrating an example of a screen for setting the timing at which information of alternative processing is initialized. This screen can be displayed from, for example, a setting menu of the printing apparatus 100. For example, in the present example of the screen, three options 1001 to 1003 related to the initialization timing are displayed along with a message 1000 "setting for the timing at which alternative processing is initialized. These options 1001 to 1003 can be selected by the user.

The option 1001 is an option to initialize the information of alternative processing at the time of shutdown of the printing apparatus 100. That is, it is an option to perform initialization at a timing similar to the second embodiment. The option 1002 is an option to initialize the information of alternative processing at an end of a print job. In this case, stored information of alternative processing of all the users is initialized at a timing at which the print job is ended. The option 1003 is an option to not perform initialization. In this case, the information of alternative processing is retained even when the power of the printing apparatus 100 is turned off. The HDD 165 may be used as the storage unit for this case.

In the present embodiment, it is possible to set a timing at which alternative processing is initialized, and so, it is possible to execute print processing according to the user's intent. For example, when it is desired to perform different alternative processing depending on the print job, the user can instruct alternative processing for each print job by setting the initialization timing to be at the end of a print job. Meanwhile, when it is desired to execute the same alternative processing for any print job, it is possible to reduce a frequency at which the user instructs alternative processing by setting the initialization timing to be at shutdown or by setting so as not to perform initialization, thereby further improving user convenience.

It may be possible to set the initialization timing by using the input/output apparatus 166 of the printing apparatus 100 or an external apparatus, such as the host computer 190. For example, a configuration may be taken so as to present options similar to that of the example of the screen in FIG. 10 on a display screen of the host computer 190 and have the printing apparatus 100 accept a setting selected by the user via the host interface (host I/F) 127. In addition, in the present embodiment, the options 1001 to 1003 are given as one example; options other than the options 1001 to 1003 may be provided, or there may be two options.

Fourth Embodiment

In a fourth embodiment, it is possible to set whether the CPU 128 executes previous alternative processing. More specifically, it is possible to select whether the CPU 128 executes the identified alternative processing when alternative processing previously instructed by the user is identified or the CPU 128 accepts an instruction for alternative processing from the user each time.

Figure 11:
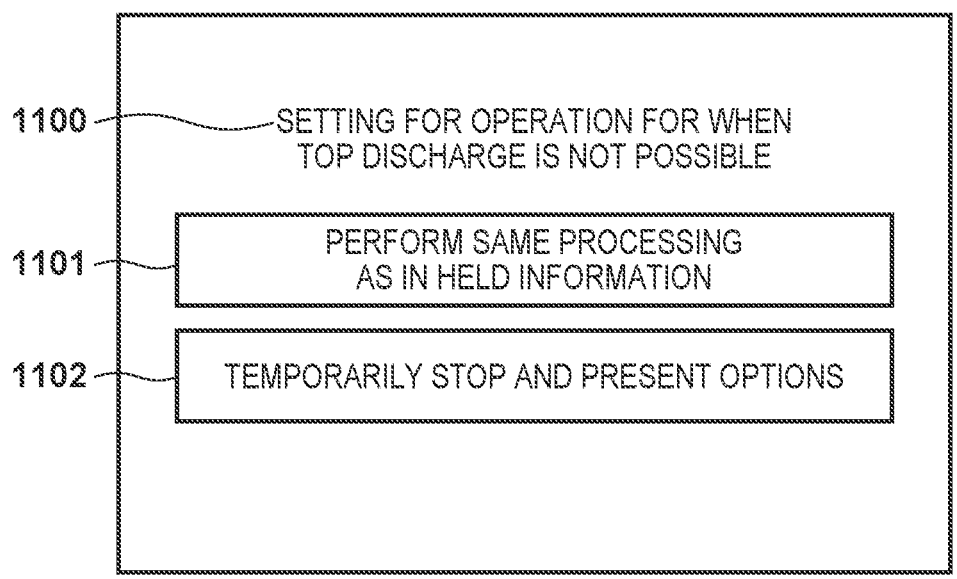
FIG. 11 is a diagram illustrating an example of a screen for setting an operation for when it is determined not to perform top discharge.

FIG. 11 is a diagram illustrating an example of a screen for setting an operation for when the CPU 128 determines not to perform top discharge. This screen can be displayed from, for example, a setting menu of the printing apparatus 100. Here, options 1101 to 1102 are presented with a message 1100 "setting for operation for when top discharge is not possible".

The option 1101 is an option to perform the same processing as alternative processing specified by information stored in a storage unit, such as the RAM 124 or the HDD 165. When the option 1101 is selected, if previously instructed alternative processing is identified when it is determined not to perform top discharge, the CPU 128 executes the identified alternative processing, similarly to the first and second embodiments.

The option 1102 is an option to temporarily stop and present options. That is, every time it is determined not to perform top discharge, the CPU 128 causes the input/output apparatus 166 to display a screen, such as the one in FIG. 6, and prompts the user to instruct alternative processing.

For example, by selecting the option 1101 in normal cases, the user can cause the printing apparatus 100 to efficiently perform print processing while saving the effort of instructing alternative processing. Meanwhile, when it is desired to provide a detailed instruction for alternative processing, the user can instruct alternative processing on a case-by-case basis in a print job by selecting the option 1102 before executing that print job.

The operation for when top discharge is not performed may be set by the input/output apparatus 166 of the printing apparatus 100 or an external apparatus, such as the host computer 190. For example, a configuration may be taken so as to present options similar to that of the example of the screen in FIG. 11 on a display screen of the host computer 190 and have the printing apparatus 100 accept a setting selected by the user via the host interface (host I/F) 127. In the present embodiment, the options 1101 to 1102 are given as one example, and other options may be provided.

Other Embodiments

The printing apparatus 100 according to the above-described embodiments is a so-called serial printing apparatus for printing an image by alternately performing scanning of an inkjet head in the X direction and conveyance of a sheet in the Y direction; however, the printing apparatus 100 may be a full, multi-type printing apparatus for printing an image on a conveyed sheet, in which a printing position of an inkjet head is fixed. The configurations of the above-described embodiments can also be applied to a printing apparatus other than an inkjet head printing apparatus. For example, the configurations can be applied to an electrophotographic printing apparatus or the like for printing an image by applying toner on a sheet.

Further, in the above-described embodiments, descriptions have been given using an example in which an image is printed on a sheet serving as a printing medium; however, the present invention is not limited to this. For example, configurations of the above-described embodiments can be applied to a printing apparatus for printing an image on a printing medium other than paper, such as a film or a cloth.

Further, in the printing apparatus 100 of the above-described embodiments, the top discharge port 2 is provided at its top portion and the front discharge port 1 is provided at its front portion. However, an arrangement and the number of discharge units may be changed as appropriate. For example, two discharge units may be provided so as to be spaced vertically apart on the front of the printing apparatus 100. In addition, the stacking unit for stacking a discharged printing medium may be provided for each of the upper and lower discharge units. In addition, alternative processing may include that a discharge destination is changed to another discharge unit when the stacking unit corresponding to a discharge unit designated as the discharge destination is fully stacked. In addition, a discharge unit may be provided on a plurality of sides of the printing apparatus 100, and three or more discharge units may be provided.

Further, in the above-described embodiments, when it is determined not to perform top discharge (step S403), if alternative processing previously instructed by the user is identified, that alternative processing is executed (step S404→step S405). In this processing, a configuration may be taken such that when the alternative processing previously instructed by the user is identified and a reason for determining not to perform top discharge this time and a reason for determining not to perform top discharge when that alternative processing was instructed are the same, the CPU 128 executes that alternative processing. In short, when the same error or the like occurs, the CPU 128 may perform alternative processing. This makes it possible to execute appropriate alternative processing for each reason for determining not to perform top discharge. However, it is possible to reduce the number of the user's operational inputs by executing alternative processing previously instructed by the user regardless of the reason for determining not to perform top discharge, similarly to the above-described embodiments.

In the above-described embodiments, when the main body cover 160, which is an example of the stacking unit, is fully stacked (a stacking amount has reached a predetermined amount), the CPU 128 determines not to perform top discharge; however, even when the CPU 128 determines as such, a response in accordance with a situation or the like of the printing apparatus 100 may be taken. For example, even when the CPU 128 determines not to perform top discharge due to the main body cover 160 being fully stacked, top discharge may be performed so long as the number of remaining pages until the print job is completed is a predetermined value or less. The predetermined value may be, for example, 1 to 10 pages, 3 to 7 pages, 4 to 6 pages, and the like. Further, the CPU 128 may temporarily stop conveyance of a printing medium before the printing medium is discharged to the main body cover 160 as alternative processing for when the main body cover 160 is fully stacked. Then, the CPU 128 may notify the user via the input/output apparatus 166 to remove the printing media stacked on the main body cover 160.

Upon comparison of the number of remaining sheets that can be stacked on the main body cover 160, which is an example of the stacking unit, and the number of input job pages, when there is a possibility that the main body cover 160 may become fully stacked during execution of a print job, the CPU 128 may prompt in advance to change the discharge destination. For example, when the CPU 128 confirms in step S401 that the discharge destination is the top discharge port 2, the CPU 128 identifies from content of the print job the number of pages for which top discharge to be performed and identifies from a result of detection of the stacking sensor 161 the number of remaining sheets that can be stacked on the main body cover 160. Then, when the number of pages for which top discharge is to be performed is greater than the number of remaining stackable sheets, the CPU 128 may accept a selection via the input/output apparatus 166 as to whether to perform front discharge. This makes it possible to prevent the discharge destination from being switched during execution of the print job.

The CPU 128 may change the order of pages so that pages with the same print settings can be successively processed in one print job. For example, when a discharge destination is set for each page in one print job, the CPU 128 may change the order in which pages are printed so that pages for which the same discharge destination is set can be successively processed.

In the above-described embodiments, the CPU 128 performs the processing of the flowchart illustrated in FIGS. 4 and 7; however, an external apparatus (e.g., the host computer 190) capable of communicating with the printing apparatus 100 may execute at least a part of the processing of the flowchart. That is, the external apparatus, such as the host computer 190, may execute at least a part of a method for controlling the printing apparatus 100 according to the above-described embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-072667, filed Apr. 26, 2022, which is hereby incorporated by reference herein in its entirety.

What is claimed is:

1. A printing apparatus comprising:
a first discharge unit configured to discharge a printing medium on which printing has been performed;
a second discharge unit configured to discharge a printing medium on which printing has been performed;
a determination unit configured to, in a case where the first discharge unit is instructed to be a discharge destination of a printing medium, determine whether to discharge the printing medium from the first discharge unit based on a predetermined condition;
an identification unit configured to, in a case where the determination unit determines not to discharge the printing medium from the first discharge unit, identify alternative processing previously instructed by a user; and
an execution unit configured to execute the alternative processing identified by the identification unit.

2. The printing apparatus according to claim 1, further comprising:
an acceptance unit configured to, in a case where the identification unit does not identify the alternative processing previously instructed by the user, accept an instruction for alternative processing from the user,
wherein in a case where the identification unit does not identify the alternative processing previously instructed by the user, the execution unit executes the alternative processing accepted by the acceptance unit.

3. The printing apparatus according to claim 2, further comprising:
a storage control unit configured to cause a storage unit to store information of the alternative processing accepted by the acceptance unit as information of the alternative processing previously instructed by the user.

4. The printing apparatus according to claim 3, wherein the storage control unit initializes the information of the alternative processing stored in the storage unit at a predetermined timing.

5. The printing apparatus according to claim 4, wherein the predetermined timing is a timing at which a print job being executed when the acceptance unit accepted the alternative processing ends.

6. The printing apparatus according to claim 4, wherein the predetermined timing is a timing at which the printing apparatus shuts down.

7. The printing apparatus according to claim 3, wherein the execution unit executes alternative processing previously instructed by a user who instructed printing of a print job being executed.

8. The printing apparatus according to claim 1, wherein:
the execution unit is capable of executing a change of the discharge destination to the second discharge unit from the first discharge unit as alternative processing.

9. The printing apparatus according to claim 1, further comprising:
a stacking unit configured to stack a printing medium discharged from the first discharge unit,
wherein the determination unit determines whether to discharge a printing medium from the first discharge unit based on a state in which a printing medium is stacked by the stacking unit.

10. The printing apparatus according to claim 1, wherein the first discharge unit discharges a printing medium from a top portion of the printing apparatus, and
the second discharge unit discharges a printing medium from a front portion of the printing apparatus.

11. The printing apparatus according to claim 9, wherein the first discharge unit discharges a printing medium from a top portion of the printing apparatus, and
the second discharge unit discharges a printing medium from a front portion of the printing apparatus.

12. The printing apparatus according to claim 1, wherein
wherein the determination unit determines whether to discharge a printing medium from the first discharge unit based on information related to a rigidity of the printing medium.

13. The printing apparatus according to claim 1, further comprising:
a feeding unit configured to feed a printing medium on which printing has not been performed onto a conveyance path,
wherein the feeding unit is capable of feeding a rolled sheet and a cut sheet as printing media, and
in a case where a cut sheet is fed from the feeding unit to the conveyance path, the determination unit determines not to discharge a printing medium from the first discharge unit.

14. The printing apparatus according to claim 13, further comprising:
a cutter configured to cut a rolled sheet,
wherein the determination unit determines whether to discharge a printing medium from the first discharge unit based on a method for cutting the rolled sheet by the cutter.

15. The printing apparatus according to claim 1, further comprising:
a setting unit configured to set whether to execute the alternative processing previously instructed by the user.

16. The printing apparatus according to claim 1, further comprising:
a printing unit configured to perform printing on a printing medium.

17. A method for controlling a printing apparatus, the apparatus comprising:
a first discharge unit configured to discharge a printing medium on which printing has been performed; and
a second discharge unit configured to discharge a printing medium on which printing has been performed, and
the method comprising:
in a case where the first discharge unit is instructed to be a discharge destination of a printing medium, determining whether to discharge the printing medium from the first discharge unit based on a predetermined condition;
in a case where it is determined not to discharge the printing medium from the first discharge unit, identifying alternative processing previously instructed by a user; and
executing the identified alternative processing.

18. The method according to claim 17, wherein
the first discharge unit discharges a printing medium from a top portion of the printing apparatus, and
the second discharge unit discharges a printing medium from a front portion of the printing apparatus.

19. A non-transitory computer-readable storage medium storing a program configured to cause a computer to function to:
in a printing apparatus comprising a first discharge unit configured to discharge a printing medium on which printing has been performed, and a second discharge unit configured to discharge a printing medium on which printing has been performed, in a case where the first discharge unit is instructed to be a discharge destination of a printing medium, determine whether to discharge the printing medium from the first discharge unit based on a predetermined condition;
in a case where it is determined not to discharge the printing medium from the first discharge unit, identify alternative processing previously instructed by a user; and
execute the identified alternative processing.

* * * * *